United States Patent
Tang et al.

(10) Patent No.: US 10,090,033 B2
(45) Date of Patent: Oct. 2, 2018

(54) PUF CIRCUIT AND MAGNETORESISTIVE DEVICE AND CONTROL METHOD THEREOF

(71) Applicant: Industrial Technology Research Institute, Hsinchu (TW)

(72) Inventors: Duan-Lee Tang, Hsinchu County (TW); Yu-Sheng Chen, Taoyuan (TW); Ding-Yeong Wang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/659,572

(22) Filed: Jul. 25, 2017

(65) Prior Publication Data

US 2018/0102155 A1    Apr. 12, 2018

Related U.S. Application Data

(60) Provisional application No. 62/404,880, filed on Oct. 6, 2016.

(30) Foreign Application Priority Data

Apr. 20, 2017   (TW) .............................. 106113250 A

(51) Int. Cl.
*G11C 11/00*    (2006.01)
*G11C 11/16*    (2006.01)
(Continued)

(52) U.S. Cl.
CPC .......... *G11C 11/161* (2013.01); *H04L 9/0861* (2013.01); *H04L 9/3278* (2013.01)

(58) Field of Classification Search
CPC ... G11C 11/16; G11C 11/161; G11C 11/1653; G11C 11/1673; G11C 7/1006
(Continued)

(56) References Cited

U.S. PATENT DOCUMENTS

| | | | |
|---|---|---|---|
| 9,230,630 B2 | 1/2016 | Zhu et al. | |
| 9,298,946 B2 | 3/2016 | Zhu et al. | |

(Continued)

FOREIGN PATENT DOCUMENTS

| | | | |
|---|---|---|---|
| CN | 105518786 | 4/2016 | |
| CN | 105518787 | 4/2016 | |

(Continued)

OTHER PUBLICATIONS

Taiwan Patent Office, Office Action, Patent Application Serial No. 106113250, dated Nov. 8, 2017, Taiwan.
(Continued)

*Primary Examiner* — Thong Q Le

(57) ABSTRACT

A physically-unclonable-function (PUF) circuit and the control method thereof are provided, and the control method can be applied to the magnetoresistive device. The control method includes providing a first energy to a plurality of magnetic-tunnel junction (MTJ) devices after initializing the MTJ devices to a resistance state, and determining whether the hamming weight of at least one of the MTJ devices which has a predetermined resistance state is within a predetermined range or not.

13 Claims, 17 Drawing Sheets

(51) Int. Cl.
*H04L 9/32* (2006.01)
*H04L 9/08* (2006.01)

(58) Field of Classification Search
USPC .................................... 365/158, 171, 230.06
See application file for complete search history.

(56) References Cited

U.S. PATENT DOCUMENTS

| | | | |
|---|---|---|---|
| 9,343,125 | B2 | 5/2016 | Tao et al. |
| 9,343,135 | B2 | 5/2016 | Zhu et al. |
| 2010/0214811 | A1* | 8/2010 | Franceschini .......... G11C 15/00 365/49.17 |
| 2015/0071430 | A1 | 3/2015 | Zhu et al. |
| 2015/0071431 | A1 | 3/2015 | Zhu et al. |
| 2015/0071432 | A1 | 3/2015 | Zhu et al. |

FOREIGN PATENT DOCUMENTS

| | | |
|---|---|---|
| TW | 201543486 | 11/2015 |
| WO | WO 2016/018503 | 2/2016 |

OTHER PUBLICATIONS

Marukame et al., "Extracting Physically Unclonable Function from Spin Transfer Switching Characteristics in Magnetic Tunnel Junctions," IEEE Transactions on Magnetics, Nov. 2014, 4 pages, vol. 50, issue 11, IEEE, US.

Zhang et al., "Highly Reliable Memory Based Physical Unclonable Function using Spin Transfer Torque MRAM," 2014 IEEE International Symposium on Circuits and Systems, Jun. 2014, pp. 2169-2172, IEEE, US.

Vatajelu et al., "STT MRAM-Based PUFs," 2015 Design, Automation & Test in Europe Conference & Exhibition, Mar. 2015, pp. 872-875, IEEE, US.

Zhang et al., "A Novel PUF Based on Cell Error Rate Distribution of STT-RAM," 2016 21st Asia and South Pacific Design Automation Conference, Jan. 2016, pp. 342-347, IEEE, US.

Suh et al., "Physical Unclonable Functions for Device Authentication and Secret Key Generation," 2007 Design Automation Conference, Jun. 2007, pp. 9-14, IEEE, US.

Katzenbeisser et al., "PUFs: Myth, Fact or Busted? A Security Evaluation of Physically Unclonable Functions (PUFs) Cast in Silicon," CHES' 12 Proceedings of the 14$^{th}$ International conference on Cryptographic Hardware and Embedded Systems, Sep. 2012, pp. 1-18, vol. 7428, Proceeding, Belgium.

Das et al., "MRAM PUF: A Novel Geometry Based Magnetic PUF with Integrated CMOS," IEEE Transactions on Nanotechnology, May 2015, pp. 436-443, vol. 14, No. 3, IEEE, US.

\* cited by examiner

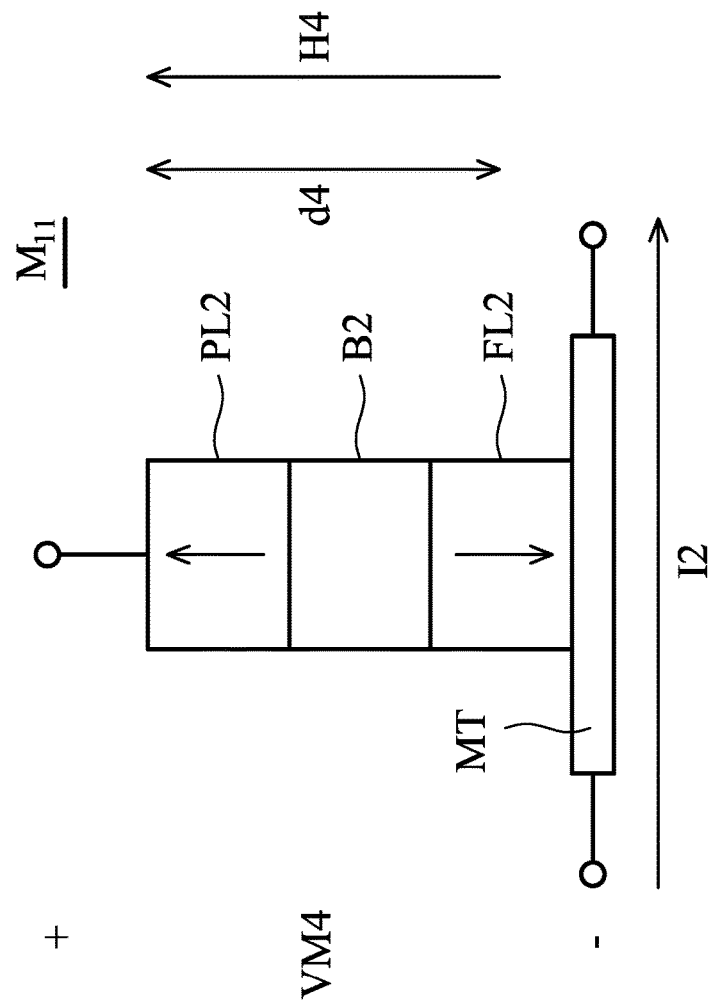

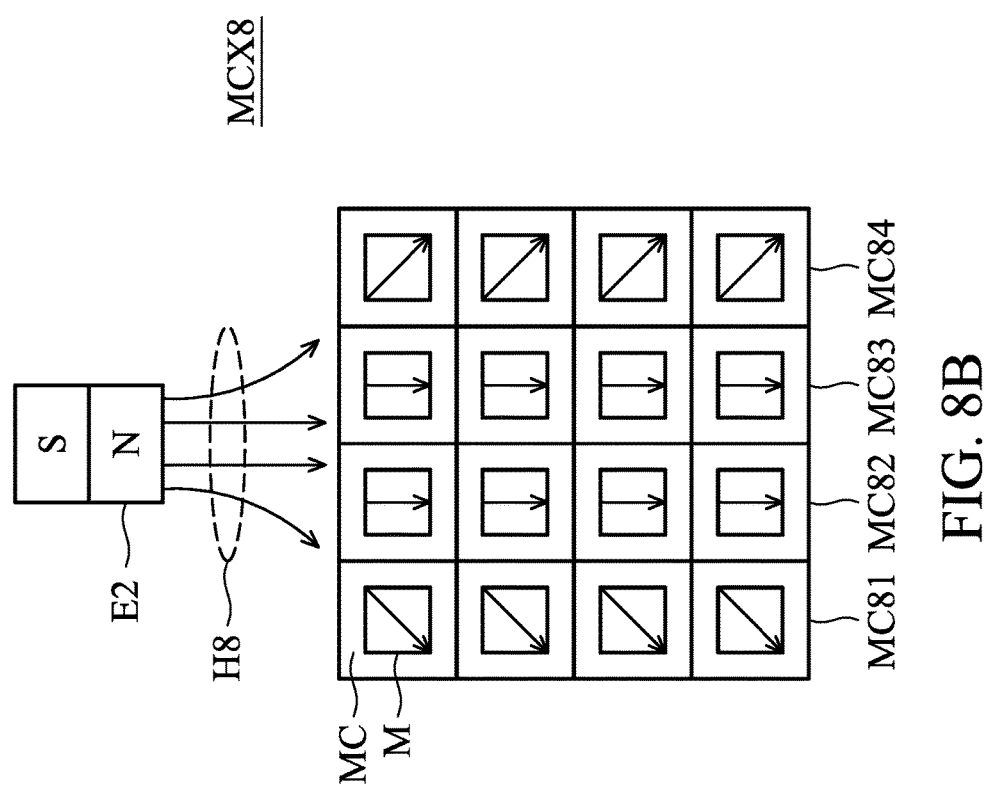

PUF CIRCUIT AND MAGNETORESISTIVE DEVICE AND CONTROL METHOD THEREOF

CROSS REFERENCE TO RELATED APPLICATIONS

This application claims the benefit of U.S. Provisional Application No. 62/404,880, filed on Oct. 6, 2016, the entirety of which is incorporated by reference herein.

The present application is based on, and claims priority from, Taiwan Application Serial Number 106113250, filed on Apr. 20, 2017, the disclosure of which is hereby incorporated by reference herein in its entirety.

TECHNICAL FIELD

The technical field relates to a physically-unclonable-function (PUF) circuit, a magnetoresistive device, and a control method of the physically-unclonable-function circuit.

BACKGROUND

A physically-unclonable function (PUF) can be utilized for data encryption. A PUF circuit provides excellent randomness based on the inherent properties of the components thereof. For example, magnetoresistive-random-access memory (MRAM) has bidirectional resistance, fast and nonvolatile characteristics, random variation of magnetic anisotropy, and a distribution of operating parameters, which makes the MRAM suitable for PUF applications.

As the development of technology proceeds, a variety of electronic devices (including portable and non-portable devices) have become able to share and exchange information through the Internet and cloud storage. In such cases, data security has become an important issue. Therefore, the circuit and control method of the PUF may be applied to data encoding or encryption applications.

SUMMARY

A detailed description is given in the following embodiments with reference to the accompanying drawings.

One exemplary embodiment provides a physically-unclonable-function circuit. The physically-unclonable-function circuit comprises a control device and a first magnetoresistive circuit array. The control device comprises an energy-generation circuit and a controller. The first magnetoresistive circuit array is coupled to the control device. The first magnetoresistive circuit array comprises a plurality of magnetoresistive circuits, wherein each magnetoresistive circuit comprises a magnetic-tunnel-junction device. After the control device initializes the magnetic-tunnel-junction devices to a resistance state, the control device provides a first energy to the magnetic-tunnel-junction devices and determines whether the hamming weight of at least one of the magnetic-tunnel-junction devices which has a predetermined resistance state is within a predetermined range or not.

One exemplary embodiment provides a magnetoresistive device. The magnetoresistive device comprises a physically-unclonable-function circuit and a second magnetoresistive circuit array. The physically-unclonable-function circuit comprises a control device and a first magnetoresistive circuit array. The control device comprises an energy-generation circuit and a controller. The first magnetoresistive circuit array is coupled to the control device. The first magnetoresistive circuit array comprises a plurality of magnetoresistive circuits, wherein each magnetoresistive circuit comprises a magnetic-tunnel-junction device. After the control device initializes the magnetic-tunnel-junction devices to a resistance state, the control device provides a first energy to the magnetic-tunnel-junction devices and determines whether the hamming weight of at least one of the magnetic-tunnel-junction devices which has a predetermined resistance state is within a predetermined range or not. The second magnetoresistive circuit array comprises the first magnetoresistive circuit array and a magnetoresistive-random-access-memory-cell array.

One exemplary embodiment provides a control method of a physically-unclonable-function circuit. The method comprises providing a first energy to a plurality of magnetic-tunnel-junction devices of a plurality of magnetoresistive circuits after initializing the magnetic-tunnel-junction devices to a resistance state; and determining whether the hamming weight of at least one of the magnetic-tunnel-junction devices which has a predetermined resistance state is within a predetermined range or not.

BRIEF DESCRIPTION OF THE DRAWINGS

The present invention can be more fully understood by reading the subsequent detailed description and examples with references made to the accompanying drawings, wherein:

FIGS. 4A and 4B illustrate the magnetic-tunnel-junction devices according to an exemplary embodiment;

FIG. 8A-8C illustrate the operation of the magnetoresistive circuit array and the external magnetic field according to an exemplary embodiment;

DETAILED DESCRIPTION

Figure 1:
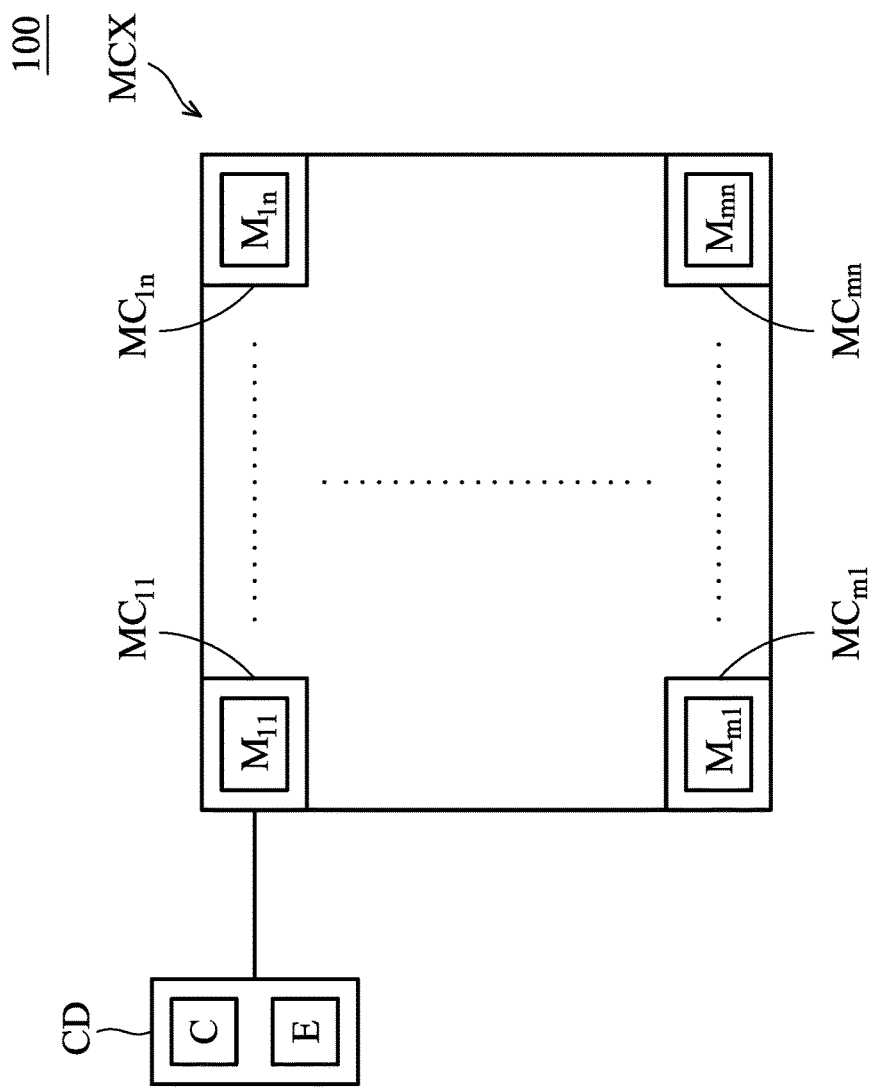
FIG. 1 illustrates a physically-unclonable-function circuit according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates a physically-unclonable-function (PUF) circuit 100 according to an exemplary embodiment. The PUF circuit 100 includes the control device CD and the magnetoresistive circuit array MCX. The control device CD includes the energy-generation circuit E and controller C. The magnetoresistive circuit array MCX includes magnetoresistive circuits $MC_{11}$-$MC_{mn}$, wherein m and n are integers. Each of the magnetoresistive circuits $MC_{11}$-$MC_{mn}$ respectively includes a magnetic-tunnel-junction (MTJ) device (i.e., the MTJ devices $M_{11}$-$M_{mn}$, of FIG. 1).

Figure 2B:
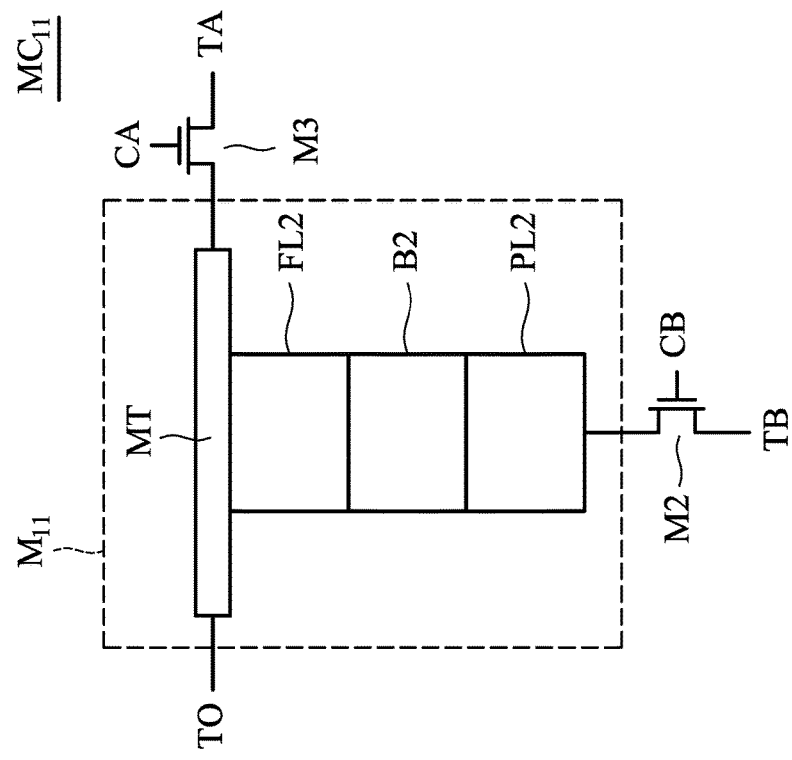
FIGS. 2A and 2B illustrate magnetoresistive circuits according to an exemplary embodiment.
Figure 2A:
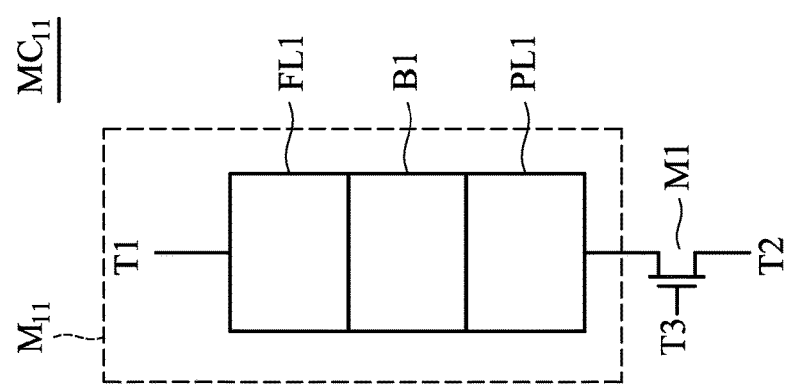

In some embodiments, the circuit structure of each of the magnetoresistive circuits $MC_{11}$-$MC_{mn}$ may be the same as a magnetoresistive-random-access-memory (MRAM) cell, as shown in FIGS. 2A and 2B.

FIG. 2A illustrates the magnetoresistive circuit $MC_{11}$ according to an exemplary embodiment. In this embodiment, magnetoresistive circuit $MC_{11}$ includes the MTJ device $M_{11}$ and transistor M1. The MTJ device $M_{11}$ includes the free layer FL1, barrier layer B1, and fixed layer PL1. One terminal of the MTJ device $M_{11}$ is connected to the transistor M1, and another terminal of the MTJ device $M_{11}$ (i.e., terminal T1) is coupled to the controller C. One terminal of the transistor M1 is connected to the MTJ device $M_{11}$, and terminals T2 and T3 of the transistor M1 are respectively coupled to the controller C.

In some embodiments, the MTJ device $M_{11}$ in FIG. 2A may be connected to the transistor M1 through the free layer FL1, and the MTJ device $M_{11}$ may be coupled to the controller C through the fixed layer PL1. In some embodiments, the material of the free layer FL1 may be the ferromagnetic metal, and the material of the barrier layer B1 may be the insulator.

In another embodiment, the circuit structure of the magnetoresistive circuit $MC_{11}$ is shown as FIG. 2B. In this embodiment, magnetoresistive circuit $MC_{11}$ includes the MTJ device $M_{11}$ and transistors M2 and M3, and the circuit structure of the magnetoresistive circuit $MC_{11}$ is the same as a spin-orbit-torque (SOT) MRAM cell. The MTJ device $M_{11}$ includes the free layer FL2, barrier layer B2, fixed layer PL2, and metal MT. One terminal of the metal MT is connected to the transistor M3, and another terminal of the metal MT (i.e., terminal TO) is coupled to the controller C. One terminal of the transistor M2 is connected to the MTJ device $M_{11}$, and terminals TB and CB of the transistor M2 are respectively coupled to the controller C. One terminal of the transistor M3 is connected to the metal MT, and terminals TA and CA of the transistor M3 are respectively coupled to the controller C.

In some embodiments, the magnetoresistive circuits $MC_{11}$-$MC_{mn}$ of the magnetoresistive circuit array MCX may have the same circuit structure. In some embodiments, the material of the free layer FL2 may be the ferromagnetic metal. The material of the barrier layer B2 may be the insulator. The material of the metal MT may be the non-ferromagnetic metal.

Figure 2D:
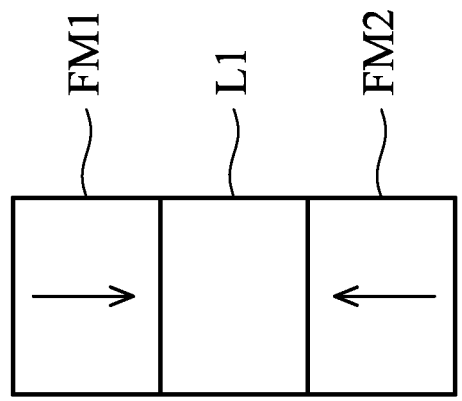
FIGS. 2C and 2D illustrate the fixed layers of the magnetic-tunnel-junction devices according to an exemplary embodiment.
Figure 2C:
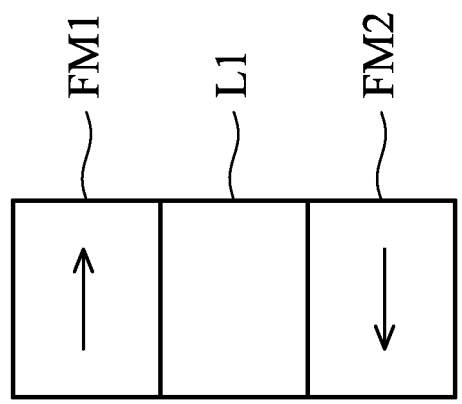

In some embodiments, the structures of the fixed layers PL1 and PL2 in FIGS. 2A and 2B are as shown in FIG. 2C or 2D. The fixed layers in FIGS. 2C and 2D respectively include layer FM1, layer L1, and layer FM2. As shown in FIGS. 2C and 2D, the direction of the magnetic moment of the layer FM1 is opposite to the direction of the magnetic moment of the layer FM2. In some embodiments, the material of layers FM1 and FM2 may be ferromagnetic metal, and the material of layer L1 may be the ruthenium (Ru).

Figure 3B:
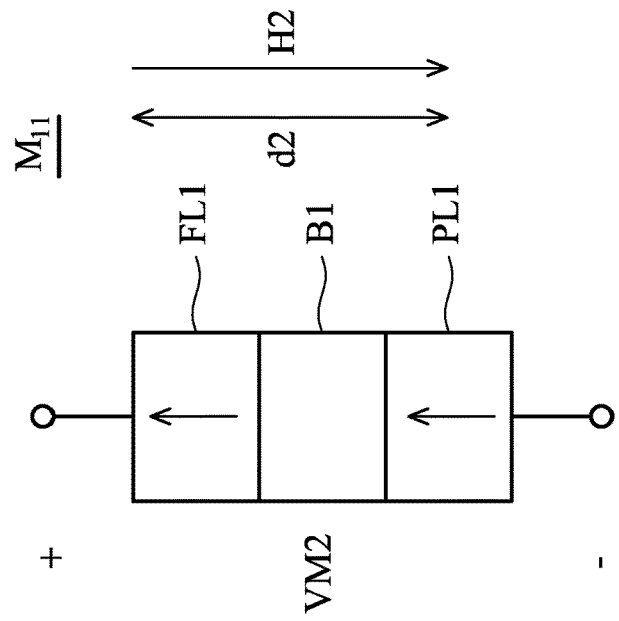
FIGS. 3A and 3B illustrate the magnetic-tunnel-junction devices according to an exemplary embodiment.
Figure 3A:
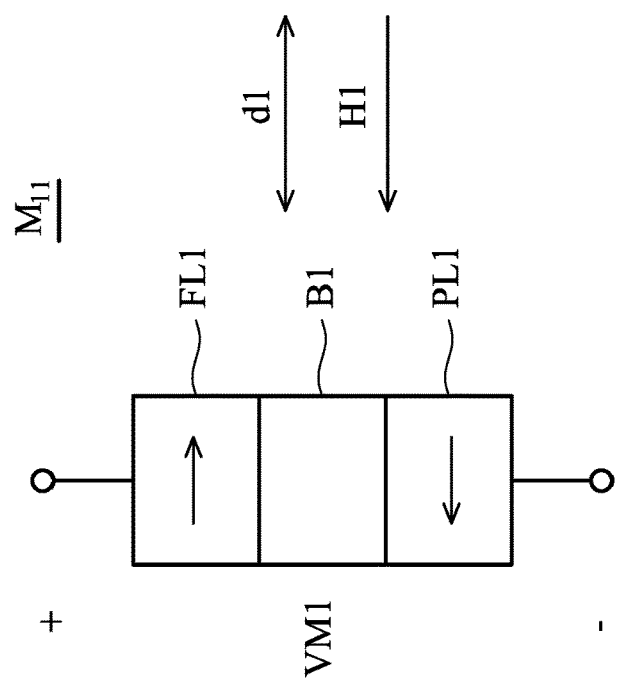

FIG. 3A illustrates the MTJ device $M_{11}$ according to an exemplary embodiment, wherein the MTJ device $M_{11}$ is the in-plane-spin type MTJ. In this embodiment, the direction of the magnetic moment of the free layer FL1 is opposite to the direction of the magnetic moment of the fixed layer PL1, so the MTJ device $M_{11}$ in FIG. 3A is in the high-resistance state. In some embodiments, the magnetic field H1 is set along the direction d1 of the easy axis of the MTJ device $M_{11}$, and the direction of the magnetic field H1 is opposite to the direction of the magnetic moment of the free layer FL1. If the magnetic strength or the operation time of the magnetic field H1 is enough, then the direction of the magnetic moment of the free layer FL1 is switched to the opposite direction by the magnetic field H1 and performs the same direction as the direction of the magnetic moment of the fixed layer PL1, which makes the MTJ device $M_{11}$ in the low-resistance state. In some embodiments, the magnetic field which makes the direction of the magnetic moment of the free layer FL1 switch to the opposite direction can be referred as the switching-magnetic field.

In some embodiments, the voltage VM1 can be applied to the MTJ device $M_{11}$, as shown in FIG. 3A. Different values of the voltage VM1 can let the magnetic field (e.g., magnetic field H1) switch the direction of the magnetic moment of the free layer FL1 to the opposite direction based on a different magnetic strength or a different operation time. In some embodiments, the direction of the magnetic moment of the free layer FL1 can be switched to the opposite direction by applying voltage VM1 to the MTJ device $M_{11}$ (as shown in FIG. 3A) and applying a magnetic field in certain direction to the MTJ device $M_{11}$. In some embodiments, the magnetic field in the direction opposite to the direction of the magnetic moment of the free layer FL1 (or any magnetic field and a voltage) can be applied to the MTJ device $M_{11}$ to shift the in-plane-spin type MTJ device $M_{11}$ from a low-resistance state to a high-resistance state.

FIG. 3B illustrates the MTJ device $M_{11}$ according to an exemplary embodiment, wherein the MTJ device $M_{11}$ is the perpendicular-spin type MTJ. In this embodiment, the direction of the magnetic moment of the free layer FL1 is the same as the direction of the magnetic moment of the fixed layer PL1, so the MTJ device $M_{11}$ in FIG. 3B is in the low-resistance state. In some embodiments, the magnetic field H2 is set along the direction d2 of the easy axis of the MTJ device $M_{11}$, and the direction of the magnetic field H2 is opposite to the direction of the magnetic moment of the free layer FL1. If the magnetic strength or the operation time of the magnetic field H2 is enough, then the direction of the magnetic moment of the free layer FL1 is switched to the opposite direction by the magnetic field H2 and is opposite to the direction of the magnetic moment of the fixed layer PL1, which makes the MTJ device $M_{11}$ in the high-resistance state.

In some embodiments, the voltage VM2 can be applied to the MTJ device $M_{11}$, as shown in FIG. 3B. Different values of the voltage VM2 can let the magnetic field H2 switch the direction of the magnetic moment of the free layer FL1 to the opposite direction based on different magnetic strength or different operation time. In some embodiments, the direction of the magnetic moment of the free layer FL1 can be switched to the opposite direction by applying voltage VM2 to the MTJ device $M_{11}$ (as shown in FIG. 3B) and applying a magnetic field in certain direction to the MTJ device $M_{11}$. In some embodiments, the magnetic field in the direction opposite to the direction of the magnetic moment of the free layer FL1 (or any magnetic field and a voltage) can be applied to the MTJ device $M_{11}$ to shift the perpendicular-spin type MTJ device $M_{11}$ from a high-resistance state to a low-resistance state.

Figure 4A:
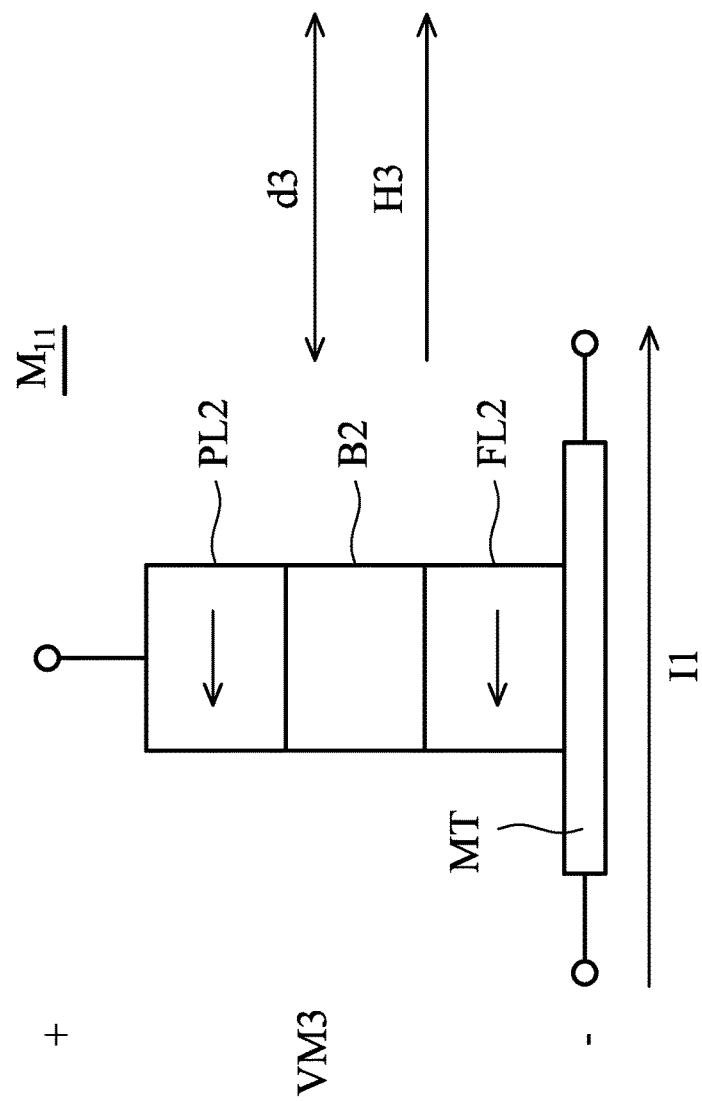

FIG. 4A illustrates the MTJ device $M_{11}$ according to an exemplary embodiment, wherein the MTJ device $M_{11}$ is the in-plane-spin type MTJ. In this embodiment, the direction of the magnetic moment of the free layer FL2 is the same as the direction of the magnetic moment of the fixed layer PL2, so the MTJ device $M_{11}$ in FIG. 4A is in the low-resistance state. In some embodiments, the magnetic field H3 is set along the direction d3 of the easy axis of the MTJ device $M_{11}$, and the direction of the magnetic field H3 is opposite to the direction of the magnetic moment of the free layer FL2. In such cases, the magnetic field H3 can make the direction of the magnetic moment of the free layer FL2 be switched and opposite to the direction of the magnetic moment of the fixed layer PL2, which makes the MTJ device $M_{11}$ in the high-resistance state.

In some embodiments, the voltage VM3 can be applied to the MTJ device $M_{11}$, as shown in FIG. 4A. Different values of the voltage VM3 can let the magnetic field H3 switch the direction of the magnetic moment of the free layer FL2 to the opposite direction based on different magnetic strength or different operation time. In some embodiments, the direction of the magnetic moment of the free layer FL2 can be switched to the opposite direction by applying voltage VM3 to the MTJ device $M_{11}$ (as shown in FIG. 4A) and applying a magnetic field in certain direction to the MTJ device $M_{11}$. In some embodiments, the magnetic field in the direction opposite to the direction of the magnetic moment of the free layer FL2 (or any magnetic field and a voltage) can be applied to the MTJ device $M_{11}$ to shift the in-plane-spin type MTJ device $M_{11}$ from a high-resistance state to a low-resistance state.

In some embodiments, the current I1 flowing through the metal MT can be utilized to make the direction of the magnetic moment of the free layer FL2 be switched to the opposite direction. In some embodiments, the direction of the magnetic moment of the free layer FL2 can be switched to the opposite direction by the current I1 and a magnetic field. In some embodiments, the direction of the magnetic moment of the free layer FL2 can be switched to the opposite direction by the current I1 and the voltage VM3. In some embodiments, the direction of the magnetic moment of the free layer FL2 can be switched to the opposite direction by the current I1, a magnetic field, and the voltage VM3.

FIG. 4B illustrates the MTJ device $M_{11}$ according to an exemplary embodiment, wherein the MTJ device $M_{11}$ is the perpendicular-spin type MTJ. In this embodiment, the direction of the magnetic moment of the free layer FL2 is opposite to the direction of the magnetic moment of the fixed layer PL2, so the MTJ device $M_{11}$ in FIG. 4B is in the high-resistance state. In some embodiments, the magnetic field H4 is set along the direction d4 of the easy axis of the MTJ device $M_{11}$, and the direction of the magnetic field H4 is opposite to the direction of the magnetic moment of the free layer FL2. In such cases, the magnetic field H4 can make the direction of the magnetic moment of the free layer FL2 be switched to the same direction as the direction of the magnetic moment of the fixed layer PL2, which makes the MTJ device $M_{11}$ in the low-resistance state.

In some embodiments, the voltage VM4 can be applied to the MTJ device $M_{11}$, as shown in FIG. 4B. Different values of the voltage VM4 can let the magnetic field H4 switch the direction of the magnetic moment of the free layer FL2 to the opposite direction based on different magnetic strength or different operation time. In some embodiments, the direction of the magnetic moment of the free layer FL2 can be switched to the opposite direction by applying voltage VM4 to the MTJ device $M_{11}$ (as shown in FIG. 4B) and applying a magnetic field in certain direction to the MTJ device $M_{11}$. In some embodiments, the magnetic field in the direction opposite to the direction of the magnetic moment of the free layer FL2 (or any magnetic field and a voltage) can be applied to the MTJ device $M_{11}$ to shift the perpendicular-spin type MTJ device $M_{11}$ from a low-resistance state to a high-resistance state.

In some embodiments, the current I2 flowing through the metal MT can be utilized to make the direction of the magnetic moment of the free layer FL2 be switched to the opposite direction. In some embodiments, the direction of the magnetic moment of the free layer FL2 can be switched to the opposite direction by the current I2 and a magnetic field. In some embodiments, the direction of the magnetic moment of the free layer FL2 can be switched to the opposite direction by the current I2 and the voltage VM4. In some embodiments, the direction of the magnetic moment of the free layer FL2 can be switched to the opposite direction by the current I2, a magnetic field, and the voltage VM4.

As shown in FIGS. 3A, 3B, 4A, and 4B, the control device CD may provide at least one of the magnetic field and current (or at least two of the magnetic field, current, and voltage) to the MTJ devices $M_{11}$-$M_{mn}$ of the magnetoresistive circuit array MCX through the energy-generation circuit E to respectively change the resistance state of the MTJ devices $M_{11}$-$M_{mn}$. In some embodiments, the energy-generation circuit E includes the voltage source, current source, electromagnet, or conductive wire (which can conduct a current).

In some embodiments, controller C controls the switching devices (e.g., transistor M1 or transistors M2 and M3) of the magnetoresistive circuits $MC_{11}$-$MC_{mn}$ to enable the magnetoresistive circuits $MC_{11}$-$MC_{mn}$. Next, the control device CD initialize the magnetoresistive circuits $MC_{11}$-$MC_{mn}$ to a resistance state (e.g., the high-resistance state or the low-resistance state) through the energy (e.g., the energy of the magnetic field, current, or voltage) provided by the energy-generation circuit E.

After completing the initialization process described above, if the control device CD provides the first energy (e.g., the energy of the magnetic field, current, or voltage) generated by the energy-generation circuit E to the MTJ devices $M_{11}$-$M_{mn}$ of the magnetoresistive circuits $MC_{11}$-$MC_{mn}$, the resistance state of each of the MTJ devices $M_{11}$-$M_{mn}$ may be changed or not changed based on the random variation of magnetic anisotropy and the distribution of operating parameters of the MTJ devices $M_{11}$-$M_{mn}$ (such as different switching conditions of the magnetic moments of the free layers of the MTJ devices $M_{11}$-$M_{mn}$, and the different switching conditions may be caused by the manufacturing process variation of the MTJ devices $M_{11}$-$M_{mn}$), which provides the function of the PUF. Besides, the changed resistance state is not sensitive to temperature variation.

Figure 5A:
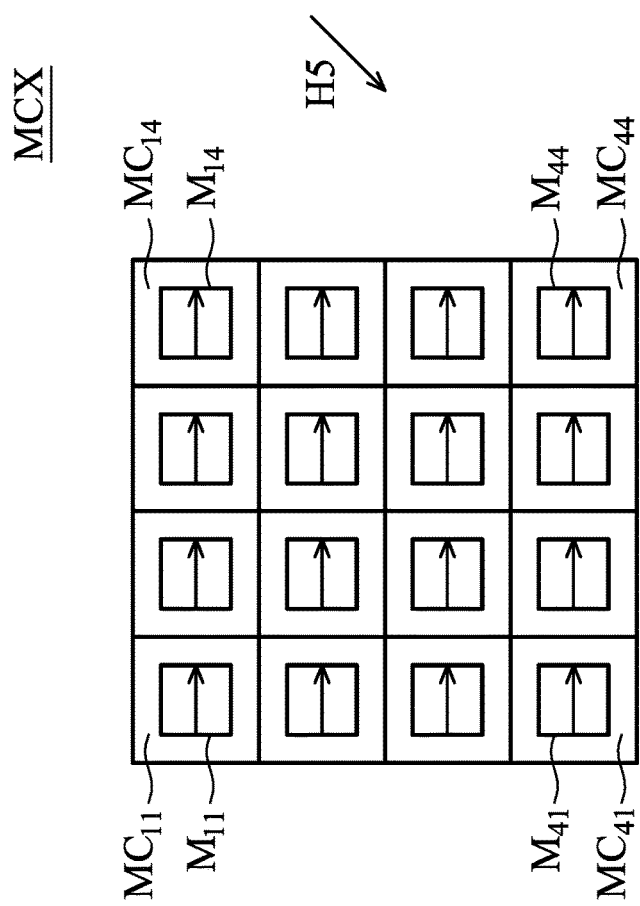
FIGS. 5A and 5B illustrate the operation of the magnetoresistive circuit array and the external magnetic field according to an exemplary embodiment.

FIG. 5A illustrates the operation of the magnetoresistive circuit array MCX and the magnetic field H5 according to an exemplary embodiment. In this embodiment, the m and n of the PUF circuit 100 are equal to 4. For the purpose of simplicity and clarity, the arrows of the MTJ devices $M_{11}$-$M_{44}$ in FIG. 5A indicate the direction of the magnetic moment of the free layer.

In this embodiment, the MTJ devices $M_{11}$-$M_{44}$ are already initialized to the same resistance state by the control device CD. In other words, the directions of the magnetic moments of the free layers of the MTJ devices $M_{11}$-$M_{44}$ are already initialized to the same direction by the control device CD.

As shown in FIG. 5A, the control device CD provides the first energy (i.e., the magnetic field H5) generated by the energy-generation circuit E to the MTJ devices $M_{11}$-$M_{44}$. The direction of the magnetic field H5 shown in FIG. 5A is for the purpose of illustration and does not limit the embodiments of the present disclosure. In some embodiments, the direction of the magnetic field H5 is parallel to the easy axis of the MTJ devices $M_{11}$-$M_{44}$ (or is parallel to the easy axis of at least one of the MTJ devices $M_{11}$-$M_{44}$), and the direction of the magnetic field H5 is opposite to the direction of the magnetic moments of the free layers of the MTJ devices $M_{11}$-$M_{44}$. The control device CD provides magnetic fields H5 to the MTJ devices $M_{11}$-$M_{44}$ to produce random distribution of the resistance states on the magnetoresistive circuit array MCX based on the random variation of magnetic anisotropy and the distribution of operating parameters of the MTJ devices $M_{11}$-$M_{44}$.

In some embodiments, after the control device CD provides the magnetic field H5 to the MTJ devices $M_{11}$-$M_{44}$, the control device CD determines whether the hamming weight of the MTJ devices which have the predetermined resistance state (e.g., the high-resistance state corresponding to the logic "1" or the low-resistance state corresponding to the logic "0") is within the predetermined range or not. The aforementioned hamming weight is equal to the number of MTJ devices having the predetermined resistance state divided by the total number of MTJ devices. For example, if the predetermined resistance state is the high-resistance state, and there are 8 MTJ devices having the high-resistance state in the MTJ devices $M_{11}$-$M_{44}$, then the hamming weight is equal to 50%. In some embodiments, the predetermined range may be set as 40%-60% to make sure that the resistance states of the MTJ devices $M_{11}$-$M_{44}$ of the magnetoresistive circuit array MCX perform random distribution.

Figure 5B:
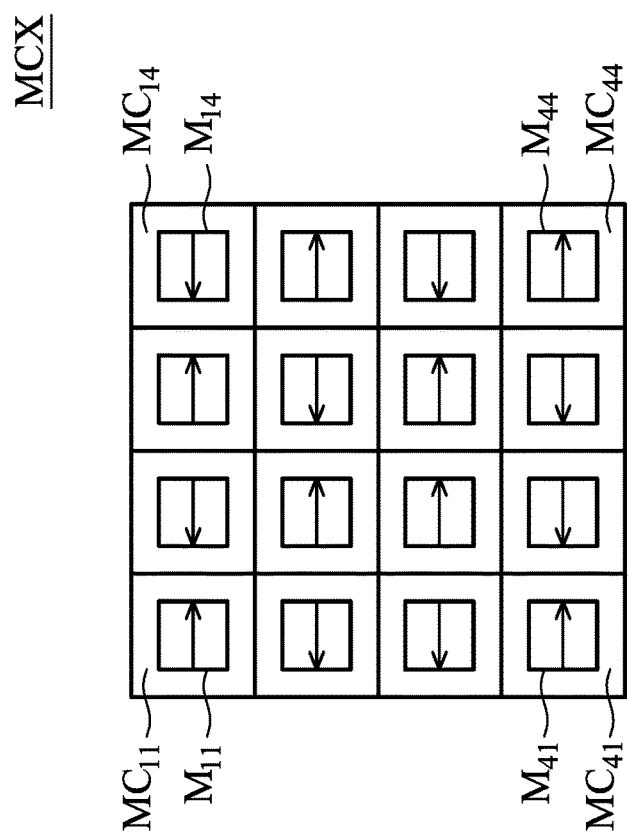
Figure 6A:
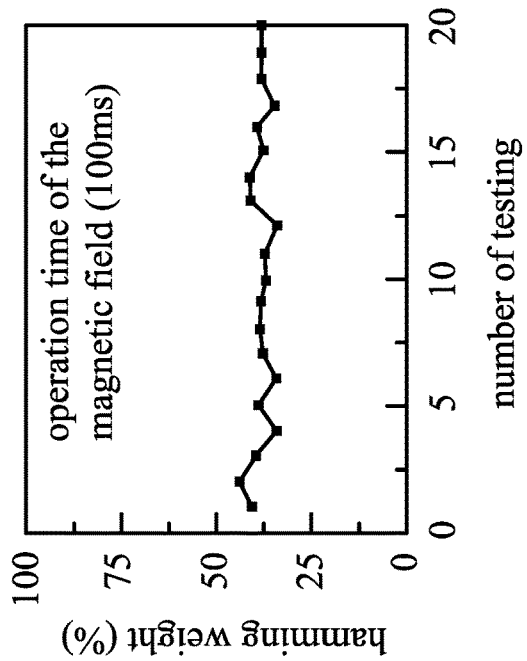
FIG. 6A-6D illustrate the relationship between the operation time of the external magnetic field and the hamming weight of the magnetic-tunnel-junction devices according to an exemplary embodiment.
Figure 6B:
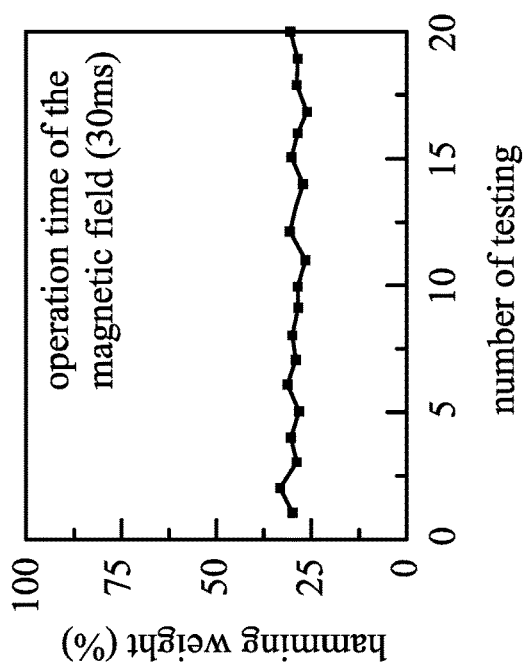
Figure 6C:
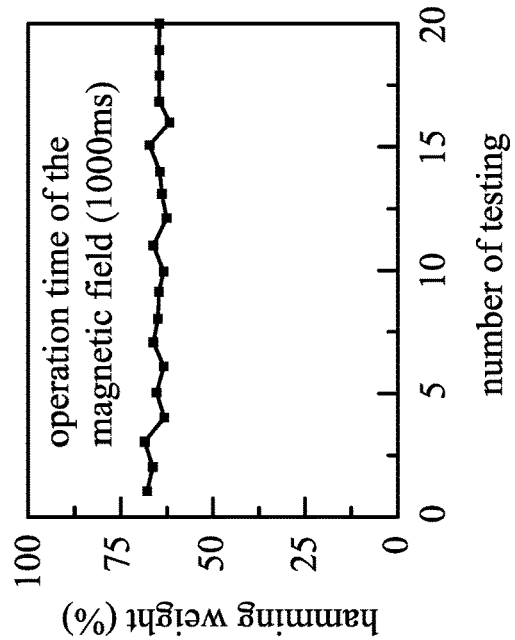
Figure 6D:
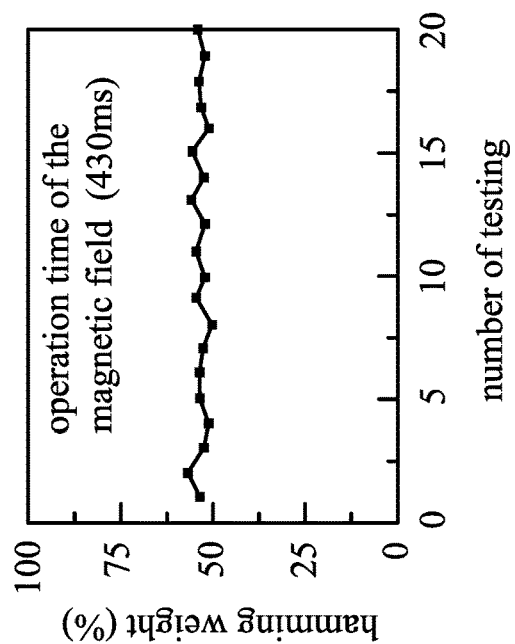

In some embodiments, if the control device CD determines that the hamming weight is within the predetermined range, then the control device CD stops providing the magnetic field H5 to the MTJ devices $M_{11}$-$M_{44}$. For example, when the control device CD determines that the hamming weight is 50% (as shown in FIG. 5B) and the predetermined range is 45%-55%, the control device CD stops providing the magnetic field H5 to the MTJ devices $M_{11}$-$M_{44}$.

In some embodiments, if the control device CD determines that the hamming weight is not within the predetermined range, then the control device CD provides the second energy (e.g., at least one of the magnetic field and current, or at least two of the magnetic field, current, and voltage) to the MTJ devices $M_{11}$-$M_{44}$. In some embodiments, the second energy and the first energy are the same. In some embodiments, the second energy and the first energy are different. In some embodiments, if the control device CD determines that the hamming weight is not within the predetermined range, then the control device CD provides different (or the same) energy (e.g., at least one of the magnetic field and current, or at least two of the magnetic field, current, and voltage) to the MTJ devices $M_{11}$-$M_{44}$ until the control device CD determines that the hamming weight is within the predetermined range.

In some embodiments, at the time that the control device CD provides the magnetic field H5 to the MTJ device $M_{11}$-$M_{44}$, the control device CD starts to determine whether the hamming weight is within the predetermined range or not. In some embodiments, after the control device CD provides the magnetic field H5 to the MTJ device $M_{11}$-$M_{44}$ for a predetermined time, the control device CD starts to determine whether the hamming weight is within the predetermined range or not.

In some embodiments, based on the random variation of magnetic anisotropy and the distribution of operating parameters of the MTJ devices $M_{11}$-$M_{mn}$, the hamming distance between different PUF circuits 100 can substantially be 50% after the randomization operation described in FIG. 5A is completed. The aforementioned hamming distance between different PUF circuits 100 is equal to the number of MTJ devices which have different resistance state compared to the MTJ devices located in the corresponding positions in another magnetoresistive circuit array divided by the total number of MTJ devices in one magnetoresistive circuit array. For example, the m and n of the PUF circuit 100 are equal to 2. In such cases, comparing the first PUF circuit 100 with the second PUG circuit 100, if the resistance states of the MTJ devices $M_{11}$, $M_{12}$, and $M_{21}$ in the first PUF circuit 100 are different from the resistance states of the MTJ devices $M_{11}$, $M_{12}$, and $M_{21}$ in the second PUF circuit 100, and the resistance state of the MTJ device $M_{22}$ in the first PUF circuit 100 is the same as the resistance state of the MTJ devices $M_{22}$ in the second PUF circuit 100, then the hamming distance between the first and second PUF circuits 100 is 75%.

In some embodiments, the circuit structures of the magnetoresistive circuits $MC_{11}$-$MC_{44}$ are shown as FIG. 2A, and the circuit structures of the MTJ devices $M_{11}$-$M_{44}$ are shown as FIG. 3A or FIG. 3B. The control device CD may provide the magnetic field (or the magnetic field and voltage) generated by the energy-generation circuit E to the MTJ devices $M_{11}$-$M_{44}$ of the magnetoresistive circuit array MCX to generate the random distribution of the resistance states in the magnetoresistive circuit array MCX. In some embodiments, the circuit structures of the magnetoresistive circuits $MC_{11}$-$MC_{44}$ are shown as FIG. 2B, and the circuit structures of the MTJ devices $M_{11}$-$M_{44}$ are shown as FIG. 4A or FIG. 4B. The control device CD may provide the current (generated by the energy-generation circuit E) or at least two of the current, magnetic field, and voltage (generated by the energy-generation circuit E) to the MTJ devices $M_{11}$-$M_{44}$ of the magnetoresistive circuit array MCX to generate the random distribution of the resistance state in the magnetoresistive circuit array MCX.

FIG. 6A-6D illustrate the relationship between the operation time of the magnetic field (i.e., the time that the magnetic field is applied to the MTJ devices), the number of testing, and the hamming weight of the MTJ devices according to an exemplary embodiment. The magnetic field is applied to the MTJ devices which are already initialized to a resistance state, and the direction of the magnetic field is parallel to the easy axis of the MTJ devices (e.g., FIG. 5A). According to FIG. 6A-6D, in the condition that the operation time of the magnetic field is increased, the hamming weight of the MTJ devices having the predetermined resistance state is increased for each time that the magnetic field is applied to the MTJ devices.

Figure 7:
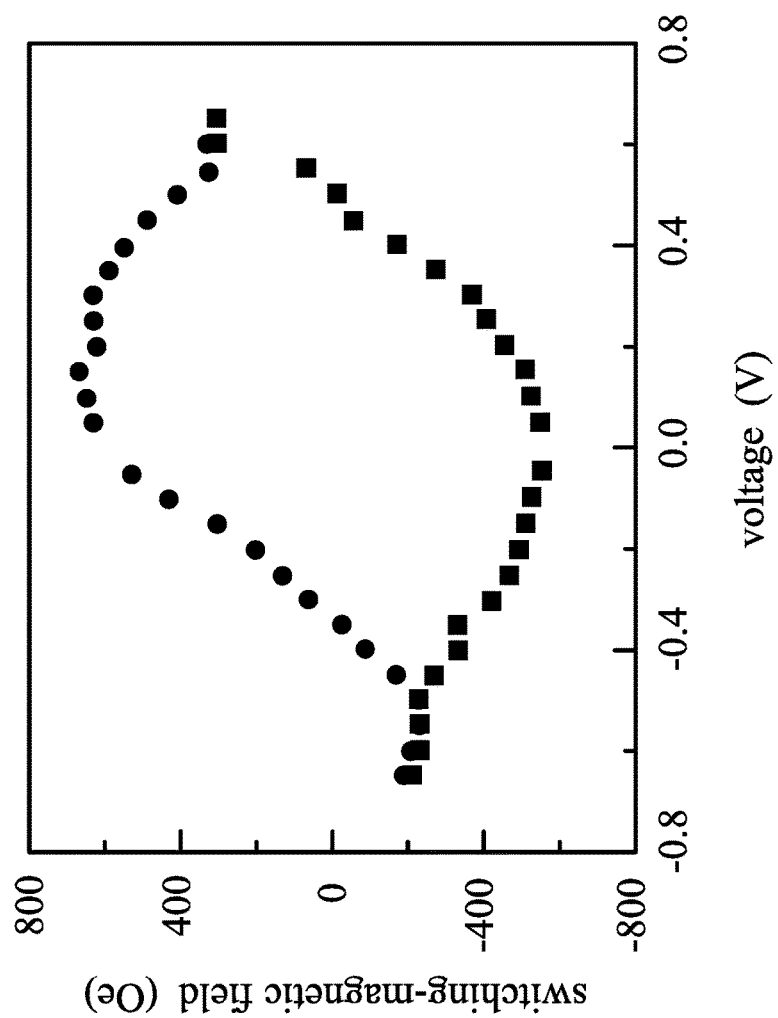
FIG. 7 illustrates the relationship between the voltage applied to the magnetic-tunnel-junction devices and the switching-magnetic field according to an exemplary embodiment.

FIG. 7 illustrates the relationship between the voltage applied to the MTJ devices (e.g., voltage VM1, VM2, VM3, or VM4) and the switching-magnetic field according to an exemplary embodiment. As shown in FIG. 7, applying different voltage to the MTJ devices can change the strength of the switching magnetic field. Therefore, in some embodiments, if a fixed magnetic field is applied to the MTJ devices, the voltage applied to the MTJ devices (e.g., voltage VM1, VM2, VM3, or VM4) can change the hamming weight of the MTJ devices.

In some embodiments, the magnetic field is applied to the MTJ devices $M_{11}$-$M_{mn}$ of the PUF circuit 100 and is parallel to the easy axis of the MTJ devices. Different from the embodiments that apply the magnetic field along the hard axis of the MTJ devices to perform the randomization operation, the embodiments applying the magnetic field along the easy axis of the MTJ devices require less magnetic energy to generate the random distribution of the resistance state in the magnetoresistive circuit array MCX.

Figure 8A:
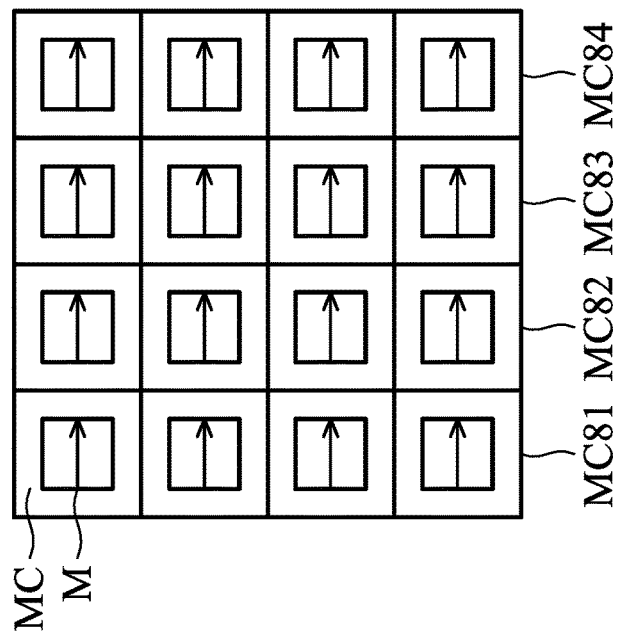
Figure 8C:
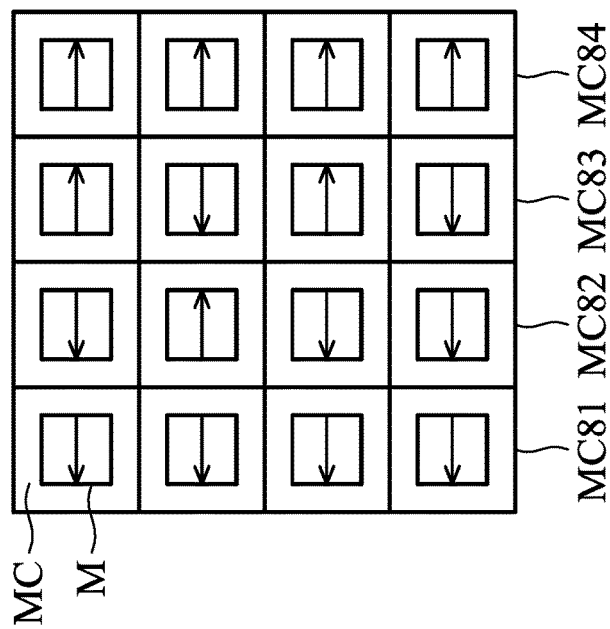

For example, in some embodiments as shown in FIG. 8A-8C, magnetoresistive circuit array MCX8 has a first column of magnetoresistive circuits MC81, a second column of magnetoresistive circuits MC82, a third column of magnetoresistive circuits MC83, and a fourth column of magnetoresistive circuits MC84. The first to fourth columns of magnetoresistive circuits MC81-MC84 respectively have four magnetoresistive circuits MC, and each magnetoresistive circuit MC includes an MTJ device M. For the purpose of simplicity and clarity, the arrows of the MTJ devices M in FIG. 8A-8C indicate the direction of the magnetic moment of the free layer.

In FIG. 8A, the MTJ devices M of the magnetoresistive circuit array MCX8 are already initialized to the same resistance state. In FIG. 8B, the energy-generation circuit E2 (e.g., a ferromagnetic metal) provides the magnetic field H8, and most of the magnetic field H8 is set along the hard axis of the MTJ devices M. The magnetic field H8 is utilized to change the directions of the magnetic moments of the free layers of the MTJ devices M. After the magnetic field H8 is removed, each magnetic moment of the free layers of the MTJ devices M is randomly change to the direction which is the same as or opposite to the initial direction and is along the easy axis of the free layers of the MTJ device M, which performs the randomization operation of the magnetoresistive circuit array MCX8.

In some embodiments, the randomization operation is performed by switching some of the magnetic moments of the MTJ devices through the magnetic field along the easy axis of the MTJ devices. Compared to the randomization operation in FIG. 8B (which has to change the direction of every magnetic moment of the free layers of the MTJ devices M), the embodiments applying the magnetic field parallel to the easy axis of the MTJ devices require less magnetic energy to generate the random distribution of the resistance state in the magnetoresistive circuit array.

On the other hand, the randomization operation which applies the magnetic field along the hard axis of the MTJ devices M may cause some MTJ devices M in the specific area of the magnetoresistive circuit array MCX8 have the specific resistance state due to the deviation or error of the direction of the magnetic field. As shown in FIGS. 8B and 8C, because of the deviation or error of the direction of the magnetic field, the magnetic moments of the MTJ devices M in the first column of magnetoresistive circuits MC81 are easily switched to the opposite direction and the magnetic moments of the MTJ devices M in the fourth column of magnetoresistive circuits MC84 easily stay in the initial direction after the randomization operation of the magnetoresistive circuit array MCX8 (as shown in FIG. 8B) is completed. Since the randomization operation shown in FIG. 8A-8C may cause the similar effects to different magnetoresistive circuit arrays MCX8, the hamming distance between different magnetoresistive circuit arrays MCX8 may be low if the magnetoresistive circuit arrays MCX8 adopt the randomization operation shown in FIG. 8A-8C. For example, the first column of magnetoresistive circuits MC81 and the fourth column of magnetoresistive circuits MC84 of different magnetoresistive circuit arrays MCX8 may have similar resistance state distribution.

Accordingly, compared to the embodiments applying the magnetic field along the hard axis of the MTJ devices $M_{11}$-$M_{mn}$, the embodiments applying the magnetic field along the easy axis of the MTJ device $M_{11}$-$M_{mn}$ require less magnetic energy to generate the random distribution of the resistance state in the magnetoresistive circuit array MCX and perform better hamming distance between different PUF circuits 100.

In some embodiments, the voltage can be respectively applied to the MTJ devices M of the magnetoresistive circuit array MCX8 while applying the magnetic field H8 to the magnetoresistive circuit array MCX8. After the magnetic field H8 is removed, each magnetic moment of the free layers of the MTJ devices M is randomly change to the direction (which is the same as or opposite to the initial direction and is along the easy axis of the free layers of the MTJ device M), which performs the randomization operation of the magnetoresistive circuit array MCX8.

Figure 9A:
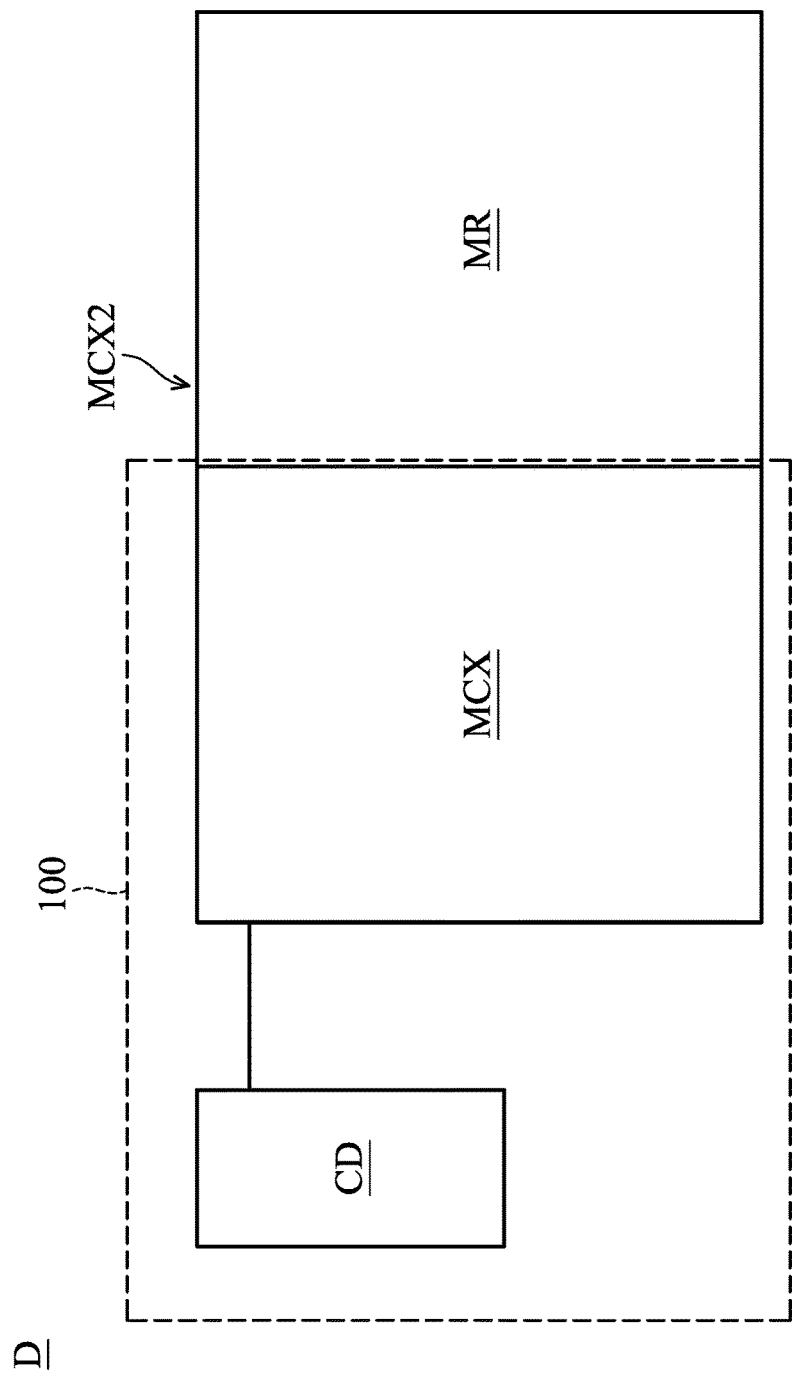
FIGS. 9A and 9B illustrate a magnetoresistive device according to an exemplary embodiment.

FIG. 9A illustrates the magnetoresistive device D according to an exemplary embodiment. The magnetoresistive device D includes control device CD and the magnetoresistive circuit array MCX2. The magnetoresistive circuit array MCX2 includes the magnetoresistive circuit array MCX and the MRAM cell array MR. The control device CD and the magnetoresistive circuit array MCX are connected to each other and form the PUF circuit 100.

As shown in FIG. 9A, the magnetoresistive circuit array MCX of the PUF circuit 100 can be integrated with the MRAM cell array (e.g., use the same circuit structure) to reduce the total circuit size.

Figure 9B:
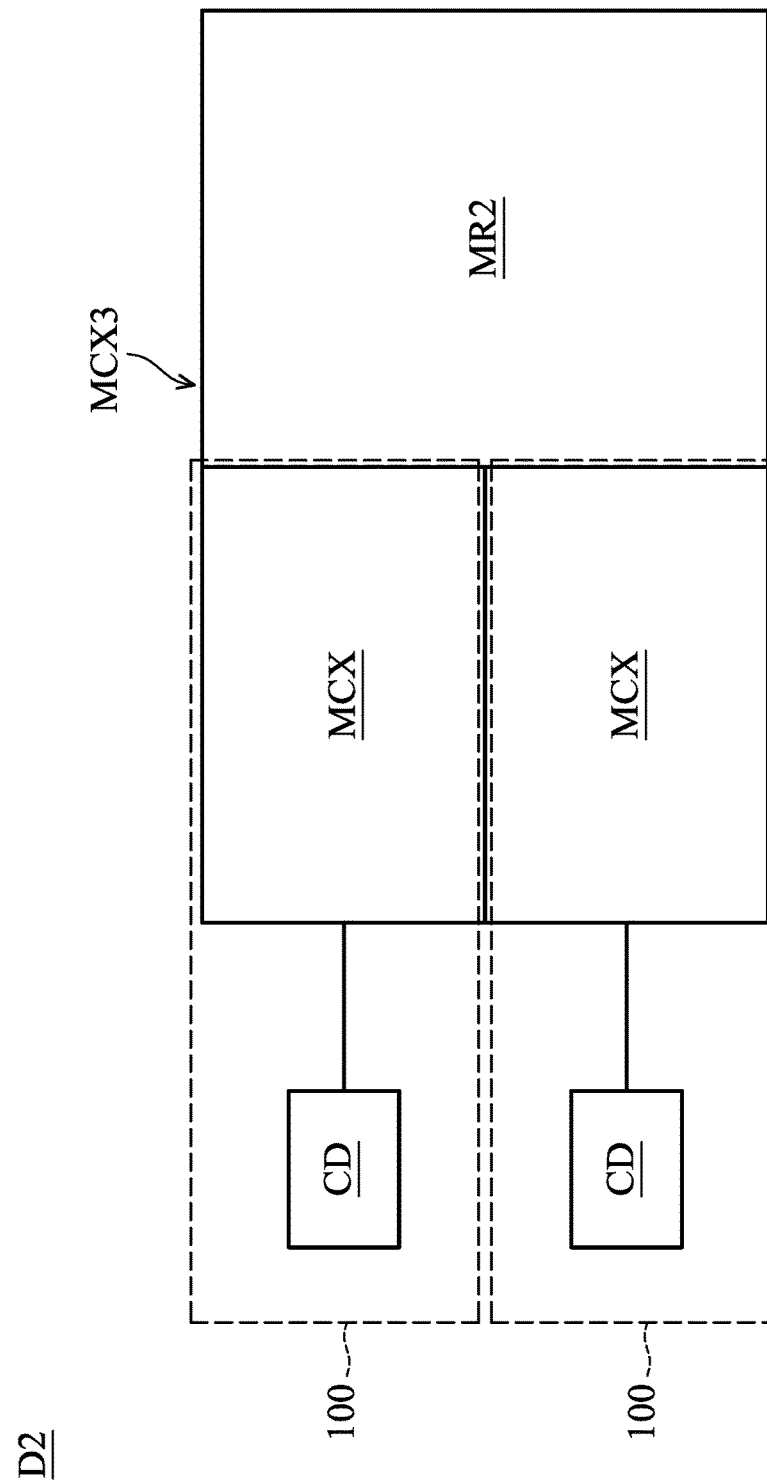

FIG. 9B illustrates the magnetoresistive device D2 according to an exemplary embodiment. The magnetoresistive device D2 includes two control devices CD and the magnetoresistive circuit array MCX3. The magnetoresistive circuit array MCX3 includes two magnetoresistive circuit arrays MCX and the MRAM cell array MR2. The two control devices CD are respectively connected to the two magnetoresistive circuit array MCX to form two PUF circuits 100.

In some embodiments, one of the PUF circuits is utilized to generate the one-time PUF key, and the other PUF circuit 100 is utilized to generate identification code each time the data is transferred. As shown in FIG. 9B, the two magnetoresistive circuit arrays MCX of the two PUF circuits 100 can be integrated with the MRAM cell array MR2 (e.g., use the same circuit structure) to reduce the total circuit size.

Figure 10:
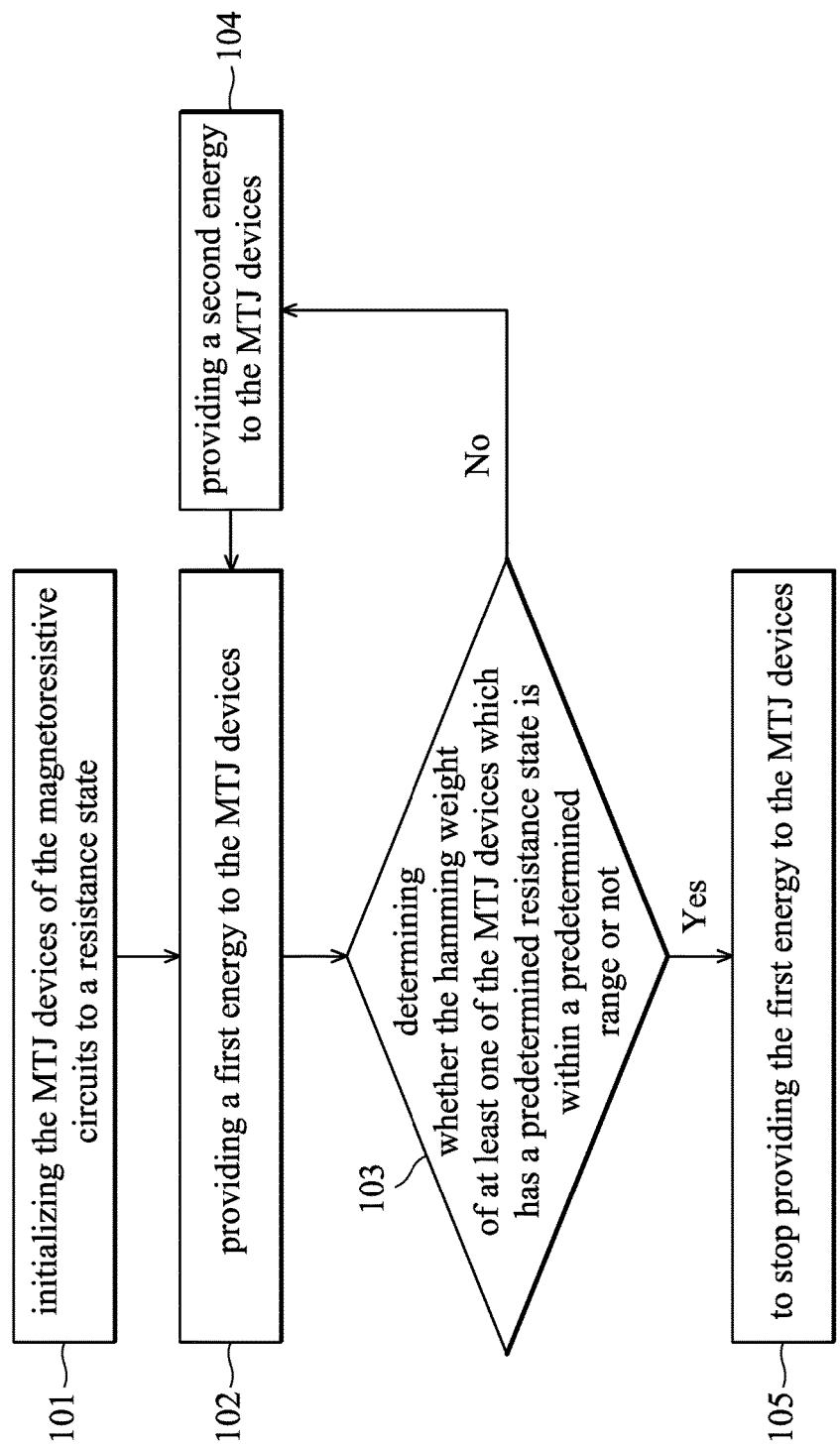
FIG. 10 illustrates a flow chart of a control method of a physically-unclonable-function circuit according to an exemplary embodiment.

FIG. 10 illustrates a flow chart of a control method of a PUF circuit according to an exemplary embodiment. In operation 101, the control method initializes the MTJ devices of the magnetoresistive circuits to a resistance state. In operation 102, the control method provides a first energy (e.g., the energy of the magnetic field, current, or voltage) to the MTJ devices. In operation 103, the control method determines whether the hamming weight of at least one of the MTJ devices which has a predetermined resistance state is within a predetermined range or not. If the hamming weight is within the predetermined range, then the flow ends in operation 105, otherwise, the flow goes to operation 104. In operation 104, the control method provides a second energy (e.g., the energy of the magnetic field, current, or voltage) to the MTJ devices. In operation 105, the control method stops providing the first energy to the MTJ devices.

In some embodiments, the second energy and the first energy are the same. In some embodiments, the second energy and the first energy are different.

In some embodiments, the first energy includes a magnetic field which lasts for a predetermined time. The direction of the magnetic field is parallel to the easy axis of at least one of the MTJ devices.

In some embodiments, the magnetoresistive circuits are spin-orbit-torque magnetoresistive-random-access-memory cells, and each of the MTJ devices is respectively connected to a metal wire. The first energy includes the current flowing through the metal wire.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A physically-unclonable-function circuit, comprising:
    a control device, comprising an energy-generation circuit and a controller; and
    a first magnetoresistive circuit array coupled to the control device, comprising a plurality of magnetoresistive circuits, wherein each magnetoresistive circuit comprises a magnetic-tunnel-junction device;
    wherein after the control device initializes the magnetic-tunnel-junction devices to a resistance state, the control device provides a first energy to the magnetic-tunnel-junction devices and determines whether a hamming weight of at least one of the magnetic-tunnel-junction devices which has a predetermined resistance state is within a predetermined range or not, wherein the hamming weight is equal to the number of magnetic-tunnel-junction devices having the predetermined resistance state divided by the total number of magnetic-tunnel-junction devices.

2. The physically-unclonable-function circuit as claimed in claim 1, wherein if the hamming weight is within the predetermined range, then the control device stops providing the first energy to the magnetic-tunnel-junction devices.

3. The physically-unclonable-function circuit as claimed in claim 1, wherein if the hamming weight is not within the predetermined range, then the control device provides a second energy to the magnetic-tunnel-junction devices.

4. The physically-unclonable-function circuit as claimed in claim 1, wherein the first energy comprises a magnetic field which lasts for a predetermined time;
    wherein a direction of the magnetic field is parallel to an easy axis of at least one of the magnetic-tunnel-junction devices.

5. The physically-unclonable-function circuit as claimed in claim 1, wherein the first energy comprises a magnetic field and a voltage respectively applied to the magnetic-tunnel-junction devices.

6. The physically-unclonable-function circuit as claimed in claim 5, wherein the magnetoresistive circuits are spin-orbit-torque magnetoresistive-random-access-memory cells, and each of the magnetic-tunnel-junction devices is respectively connected to a metal wire;
    wherein the first energy comprises a current flowing through the metal wire.

7. The physically-unclonable-function circuit as claimed in claim 1, wherein the magnetoresistive circuits are spin-orbit-torque magnetoresistive-random-access-memory cells, and each of the magnetic-tunnel-junction devices is respectively connected to a metal wire;
    wherein the first energy comprises a current flowing through the metal wire.

8. The physically-unclonable-function circuit as claimed in claim 1, wherein the magnetoresistive circuits are spin-orbit-torque magnetoresistive-random-access-memory cells, and each of the magnetic-tunnel-junction devices is respectively connected to a metal wire;
    wherein the first energy comprises at least two of a magnetic field, a voltage respectively applied to the magnetic-tunnel-junction devices, and a current flowing through the metal wire.

9. A magnetoresistive device, comprising:
    a physically-unclonable-function circuit, comprising:
        a control device, comprising an energy-generation circuit and a controller; and
        a first magnetoresistive circuit array coupled to the control device, and the first magnetoresistive circuit array comprises a plurality of magnetoresistive circuits, wherein each magnetoresistive circuit comprises a magnetic-tunnel-junction device;
        wherein after the control device initializes the magnetic-tunnel-junction devices to a resistance state, the control device provides a first energy to the magnetic-tunnel-junction devices and determines whether a hamming weight of at least one of the magnetic-tunnel-junction devices which has a predetermined resistance state is within a predetermined range or not, wherein the hamming weight is equal to the number of magnetic-tunnel-junction devices having the predetermined resistance state divided by the total number of magnetic-tunnel-junction devices; and
    a second magnetoresistive circuit array, comprising the first magnetoresistive circuit array and a magnetoresistive-random-access-memory-cell array.

10. A control method of a physically-unclonable-function circuit, comprising:
    providing a first energy to a plurality of magnetic-tunnel-junction devices of a plurality of magnetoresistive circuits after initializing the magnetic-tunnel-junction devices to a resistance state; and
    determining whether a hamming weight of at least one of the magnetic-tunnel-junction devices which has a predetermined resistance state is within a predetermined range or not, wherein the hamming weight is equal to the number of magnetic-tunnel-junction devices having the predetermined resistance state divided by the total number of magnetic-tunnel-junction devices.

11. The control method as claimed in claim 10, further comprising:
    if the hamming weight is within the predetermined range, to stop providing the first energy to the magnetic-tunnel-junction devices; and
    if the hamming weight is not within a predetermined range, providing a second energy to the magnetic-tunnel-junction devices.

12. The control method as claimed in claim 10, wherein the first energy comprises a magnetic field which lasts for a predetermined time;
    wherein a direction of the magnetic field is parallel to an easy axis of at least one of the magnetic-tunnel-junction devices.

13. The control method as claimed in claim 10, wherein the magnetoresistive circuits are spin-orbit-torque magnetoresistive-random-access-memory cells, and each of the magnetic-tunnel-junction devices is respectively connected to a metal wire;

wherein the first energy comprises a current flowing through the metal wire.

* * * * *